United States Patent
Martinez Canedo et al.

(10) Patent No.: US 11,853,903 B2
(45) Date of Patent: Dec. 26, 2023

(54) SGCNN: STRUCTURAL GRAPH CONVOLUTIONAL NEURAL NETWORK

(71) Applicant: Siemens Aktiengesellschaft, Munich (DE)

(72) Inventors: Arquimedes Martinez Canedo, Plainsboro, NJ (US); Jiang Wan, Irvine, CA (US); Blake Pollard, Jupiter, FL (US)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 1493 days.

(21) Appl. No.: 16/018,232

(22) Filed: Jun. 26, 2018

(65) Prior Publication Data

US 2019/0095806 A1  Mar. 28, 2019

Related U.S. Application Data

(60) Provisional application No. 62/630,294, filed on Feb. 14, 2018, provisional application No. 62/613,548, (Continued)

(51) Int. Cl.
*G06N 5/02* (2023.01)
*G06N 5/04* (2023.01)
(Continued)

(52) U.S. Cl.
CPC ......... *G06N 5/022* (2013.01); *G06F 16/9024* (2019.01); *G06F 17/15* (2013.01);
(Continued)

(58) Field of Classification Search
CPC ......... G06N 5/046; G06N 20/00; G06N 5/022
See application file for complete search history.

(56) References Cited

U.S. PATENT DOCUMENTS 10,157,333 B1 * 12/2018 Wang ................... G06V 10/764
2018/0039249 A1 * 2/2018 Johnson ................. G05B 17/02
(Continued)

FOREIGN PATENT DOCUMENTS

CN    107015963 A    8/2017

OTHER PUBLICATIONS

William Hamilton, "Representation Learning on Graphs: Methods and Applications", 2017 (Year: 2017).*
(Continued)

*Primary Examiner* — Ann J Lo
*Assistant Examiner* — Van C Mang

(57) ABSTRACT

A computer-implemented method for learning structural relationships between nodes of a graph includes generating a knowledge graph comprising nodes representing a system and applying a graph-based convolutional neural network (GCNN) to the knowledge graph to generate feature vectors describing structural relationships between the nodes. The GCNN comprises: (i) a graph feature compression layer configured to learn subgraphs representing embeddings of the nodes of the knowledge graph into a vector space, (ii) a neighbor nodes aggregation layer configured to derive neighbor node feature vectors for each subgraph and aggregate the neighbor node feature vectors with their corresponding subgraphs to yield aggregated subgraphs, and (iii) a subgraph convolution layer configured to generate the feature vectors based on the aggregated subgraphs. Functional groups of components included in the system may then be identified based on the plurality of feature vectors.

16 Claims, 14 Drawing Sheets

Related U.S. Application Data filed on Jan. 4, 2018, provisional application No. 62/564,318, filed on Sep. 28, 2017.

(51) Int. Cl.

| | |
|---|---|
| *G06F 17/15* | (2006.01) |
| *G06N 20/00* | (2019.01) |
| *G06F 16/90* | (2019.01) |
| *G06Q 10/04* | (2023.01) |
| *G06N 3/04* | (2023.01) |
| *G06N 5/022* | (2023.01) |
| *G06N 5/046* | (2023.01) |
| *G06F 16/901* | (2019.01) |
| *G06F 18/21* | (2023.01) |
| *G06N 3/045* | (2023.01) |
| *G06Q 50/00* | (2012.01) |

(52) U.S. Cl.
CPC ............. *G06F 18/21* (2023.01); *G06N 3/045* (2023.01); *G06N 5/046* (2013.01); *G06N 20/00* (2019.01); *G06Q 10/04* (2013.01); *G06Q 50/01* (2013.01)

(56) References Cited

U.S. PATENT DOCUMENTS

2018/0324117 A1* 11/2018 Badr ................. H04L 51/10
2020/0090085 A1 3/2020 Martinez Canedo et al.

OTHER PUBLICATIONS

Kipf "Semi-Supervised Classification With Graph Convolutional Networks", 2016 (Year: 2017).*
Yu, "Classifying Large Data Sets Using SVMs with Hierarchical Clusters", 2003 (Year: 2003).*
Adhikari, "Distributed Representation of Subgraphs", 2017 (Year: 2017).*
Banerjee, "Generating Digital Twin models using Knowledge Graphs for Industrial Production Lines", 2017 (Year: 2017).*
EP Summons Opinion; European Patent Application No. 18194456. 2; 40 pages.
Hamilton, William L., et al., "representation learning on graphs: methods and applications", Sep. 27, 2017, IEEE, XP80821770A / Sep. 27, 2017.
Peng, Wang, et al., link prediction in social networks: the state-of-the-art, Science China, Information Sciences, Jan. 2015, vol. 58, 011101/1-0111101-38, doi: 10.1007/s11432-014-5237-y, XP35434501A/ Jan. 1, 2015.
EP Search Report received Feb. 5, 2019; Application No. 18194456. 2-1221; 11 pages.
Bijaya Aohikari et al: "Distributed Representation of Subgraphs", arxiv.org, Cornell University Library, 201 Olin Library Cornell University Ithaca, NY 14853, Feb. 22, 2017 (Feb. 22, 2017), XP080748191, 001: 10.1109/ICOMW.2017.20.
Search Report dated Sep. 14, 2020; EP Application No. 18.194. 456.2-1203; 9 pages.
"Convolutional neural on graphs with fast localized spectral filtering"; Michael Defferrard; Xavier Bresson; Pierre Vandergheynst; 2016.
Mikolov, Tomas, et al. "Distributed representations of words and phrases and their compositionality." Advances in neural information processing systems. 2013.
"Semi-Supervised Classification With Graph Convolutional Networks"; Thomas N. Kipf; Max Welling; Published as a conference paper at ICLR 2017.
"Inductive Representation Learning on Large Graphs" William L. Hamilton; Rex Ying; Jure Leskovec; Department of Computer Science; Stanford University; 2017.
"Deep Learning and the Information Bottleneck Principle" Naftali Tishby; Noga Zaslavsky.

* cited by examiner

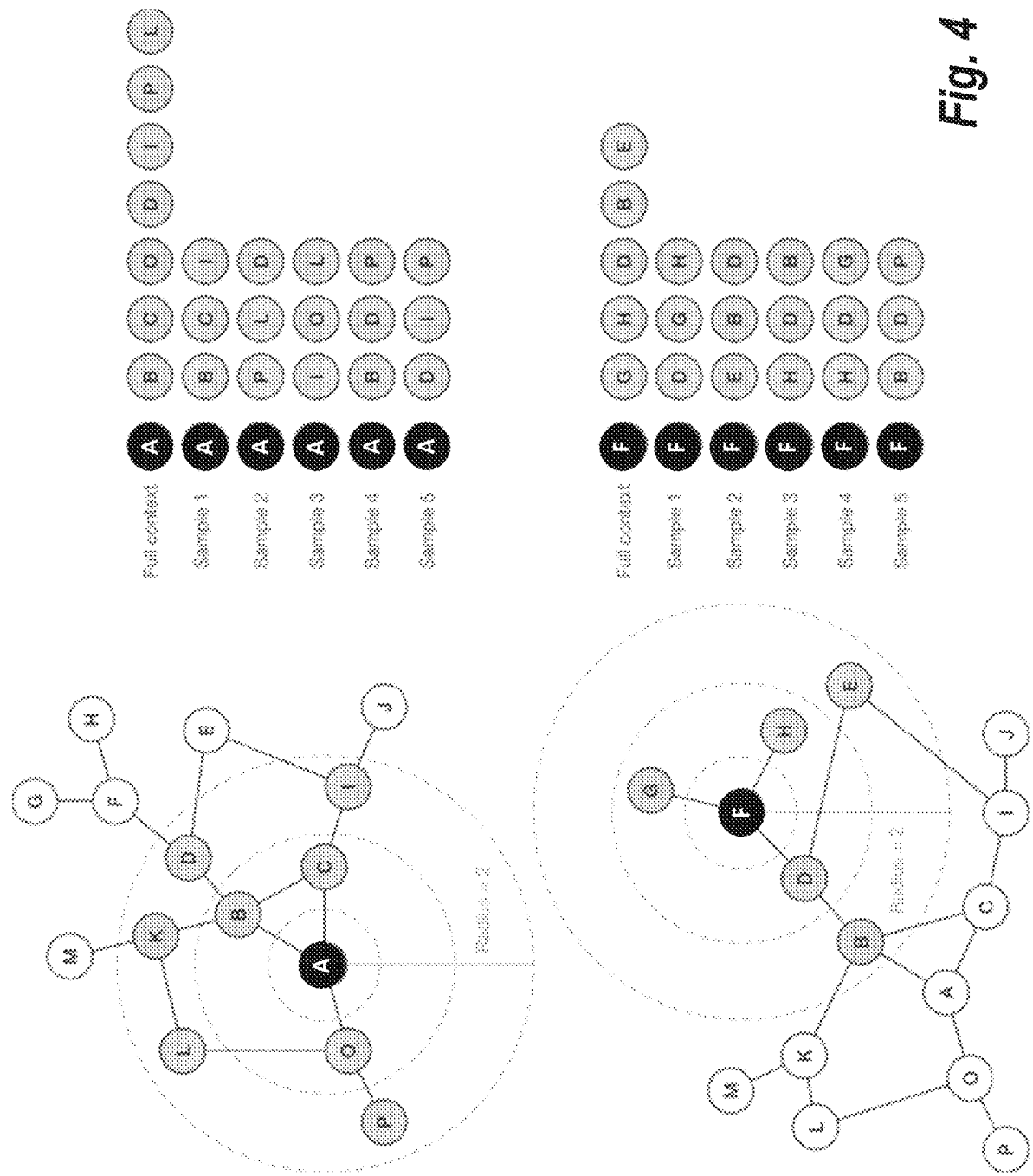

SGCNN: STRUCTURAL GRAPH CONVOLUTIONAL NEURAL NETWORK

CROSS-REFERENCE TO RELATED APPLICATIONS

This application claims the benefit of U.S. Provisional Application Ser. No. 62/564,318 filed Sep. 28, 2017, 62/630,294 filed Feb. 14, 2018, and 62/613,548 filed Jan. 4, 2018 all of which are incorporated herein by reference in their entirety.

TECHNOLOGY FIELD

The present invention relates generally to methods, systems, and apparatuses related to a convolutional neural network (CNN) designed to perform graph invariant learning tasks at a graph- and subgraph-level. The disclosed methods, systems, and apparatuses may be applied to, for example, analyzing functional data corresponding to digital twins.

BACKGROUND

Machine learning and Convolutional Neural Networks (CNN) have achieved great success on solving problems such as clustering and classification for grid-structured Euclidean data (e.g., 1-D signals such as time series, and 2-D data sets such as images). However, many other real world problems require learning on non-structured data. For example, in the engineering domain, many non-Euclidean data sets are created during the design stage (e.g., 1D system-level models, 3D CAD models, data flow diagrams, etc.) and during the manufacturing stage (e.g., production flow diagrams). The main problem is that the same convolution operation on Euclidean data cannot be applied on non-Euclidean data such as graphs. This is because the non-Euclidean data has varied structures which are not regular. Thus, a new convolution kernel on the non-Euclidean data is necessary to achieve the same level success of convolutional neural networks on Euclidean data.

Recently, there are several contributions proposing general CNN for graph-structured data. In general, there are two approaches to achieve CNN on graphs. One is based on spectral domain analysis, the other is based on vertex domain analysis. The spectral domain approach has a major limitation in that it is not graph invariant. This is because all the spectral domain approaches rely on the Laplacian matrix of the graph which is graph-dependent. In other words, the Fourier transform on different graphs will be different (due to the eigenvectors of Laplacian matrix which is graph-dependent), thus a CNN trained for one graph cannot be applied on a different graph. On the other hand, most vertex domain approaches are based on the aggregation of neighbor nodes information for every node in the graph, thus they are graph invariant. Such an approach has shown the effectiveness on node-level clustering and classification. However, the vertex domain approach also has a limitation in that it only works at the node-level. In many real world problems, we want to be able to cluster or classify a whole graph or subgraph instead of a single node (e.g., 3D CAD model, social networks). Making an analogy to image classification, this is equivalent of classifying whole images, rather than just pixels.

In addition to CNN on graphs, graph kernels have been used in structure mining to measure the similarity of pairs of graphs. Graph kernels can be used to classify or cluster graphs and subgraphs, however, they only consider the structure similarity between pairs of graphs. In real world examples, two subgraphs with different structures are not necessarily in different clusters. For example, two 3D-CAD models of a car may have different structures, but they will still be in the same cluster labeled as "automotive". Thus, graph kernels are not sufficient to accomplish this task.

SUMMARY

The present invention, as described in various embodiments herein, describes a Structured Graph Convolutional Neural Network (SGCNN) that is able to perform graph invariant learning tasks at a graph- and subgraph-level.

According to some embodiments, a computer-implemented method for learning structural relationships between nodes of a graph includes generating a knowledge graph comprising nodes representing a system and applying a graph-based convolutional neural network (GCNN) to the knowledge graph to generate feature vectors describing structural relationships between the nodes. The GCNN comprises: (i) a graph feature compression layer configured to learn subgraphs representing embeddings of the nodes of the knowledge graph into a vector space, (ii) a neighbor node aggregation layer configured to derive neighbor node feature vectors for each subgraph and aggregate the neighbor node feature vectors with their corresponding subgraphs to yield a aggregated subgraphs, and (iii) a subgraph convolution layer configured to generate the feature vectors based on the aggregated subgraphs. Functional groups of components included in the system may then be identified based on the plurality of feature vectors.

According to other embodiments, a computer-implemented method for learning structural relationships between nodes of a graph includes receiving a knowledge graph comprising subgraphs labeled with functional labels describing one or more systems. Each subgraph corresponds to a subsystem of at least one of the systems. A GCNN is trained to classify structural relationships between nodes of the subgraphs into the functional labels. Then, when a new knowledge graph corresponding to a new system is received, the GCNN may be used to determine a plurality of functional scores for the new system, with each function score corresponding to one of the functional labels.

According to other embodiments, a computer-implemented method for inferring functionality of a system includes generating a knowledge graph representative of the system. This knowledge graph comprises a plurality of subgraphs corresponding to subsystems of the system. A GCNN is used to determine functional scores for the system. Each function score corresponding to one of a plurality of functional labels describing the subsystems. Based on the functional scores, a functionally equivalent alternative subsystem for at least one of the subsystems of the system. Once identified, the functionally equivalent alternative subsystem(s) may be presented to a user along with a measurement of how similar the functionally equivalent alternative subsystem(s) are to the system of interest.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures:

FIG. 4 provides an example of context sampling that may be employed in some embodiments;

DETAILED DESCRIPTION OF ILLUSTRATIVE EMBODIMENTS

The following disclosure describes the present invention according to several embodiments directed at methods, systems, and apparatuses related to a Structured Graph Convolutional Neural Network (SGCNN) that is able to perform graph invariant learning tasks at a graph- and subgraph-level. The SGCNN architecture performs training tasks at graph/subgraph level. This architecture provides numerous other benefits over conventional solutions, including a new graph feature compression for graph-based learning based on Node2Vec embeddings, a path-based neighbor nodes aggregation method that aggregates vertex domain neighbor nodes information onto subgraphs, and a subgraph convolution kernel that can perform graph invariant convolution operations on graphs or subgraphs.

In the disclosure that follows, a graph is defined as $\mathcal{V}=(\mathcal{V},\mathcal{E})$, where $\mathcal{V}$ is the set of vertices and $\mathcal{E}$ is the set of edges. The graph edges can be weighted and directed in some embodiments. However, for simplicity, the description that follows focuses on an unweighted graph. For each $v_i \in \mathcal{V}$, the features are defined to be $f_i$. The adjacency matrix of $\mathcal{G}$ is defined to be $\overline{A}$. A subgraph is defined as $\mathcal{G}_s=(\mathcal{V}_s, \mathcal{E}_s)$, where $\mathcal{V}_s \in \mathcal{V}$ and $\mathcal{E}_s \in \mathcal{E}$.

Figure 1:
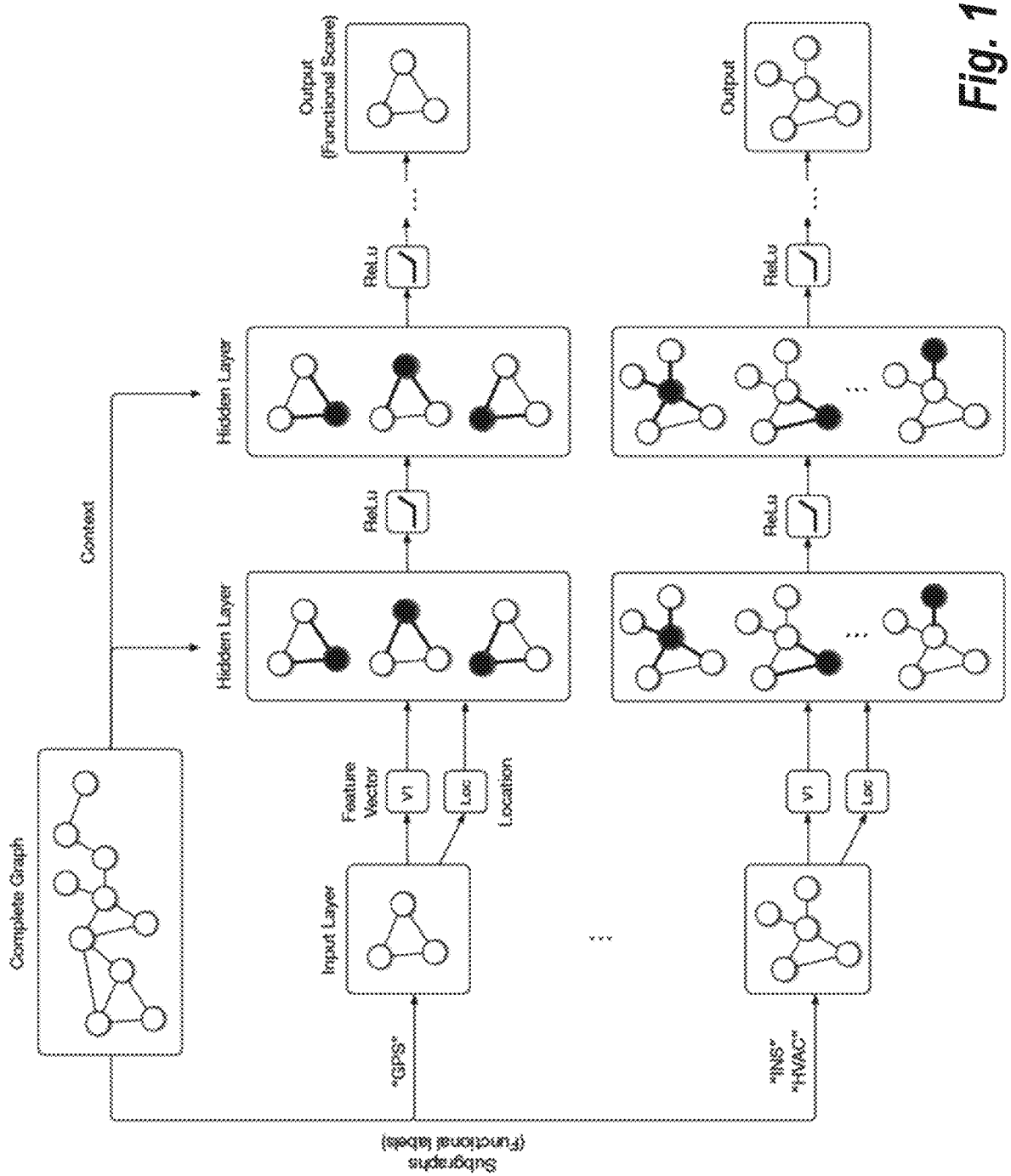
FIG. 1 provides a conceptual overview of the SGCNN architecture, according to some embodiments.

FIG. 1 provides a conceptual overview of the SGCNN architecture. The SGCNN is trained on labeled functional graph examples that exist in a knowledge graph. One example of a knowledge graph that may be utilized with the SGCNN is the digital twin graph (DTG). The DTG is described in greater detail in International Application No. PCT/US17/13647 entitled "Digital Twin Graph," the entirety of which is incorporated herein by reference.

Drawing on the analogy between the graph Laplacian and the Laplacian differential operator, several groups have recently proposed architectures for graph-based convolutional neural networks. One shortcoming of the initial incarnation of GCNNs is that they can only handle graphs with the same number of nodes and with similar graph structures. The picture to have in mind is that of a number of copies of the same graph, each with different node-level features. Some subset of these graph instances are labelled at the node level. One can train a GCNN which, given a new graph instance, will provide a node-level labelling based on what it has observed in the course of training. The graph Laplacian provides a natural way for the model to combine the features of neighboring nodes in the graph in order to better label nodes in the graph. We generalize this baseline architecture in two ways. First, we are interested not just in node-level labelling, but in the labelling of structures within the graph. Second, the model described below is capable of labelling structures in graphs with different numbers of nodes.

In order to classify structures, we utilize labelled examples of structures within the graph. We can then build up the neighborhood around such substructures and sample from these neighborhoods to provide context for the structure. This gives us two levels of context, context within a structure and context around the structure. The goal of the embedding is to provide features to the SGCNN which are generic in the sense that they do not encode overly specific information about the various structures in which a node appears, this is the job of the SGCNN, but which are specific with respect to our proposed SGCNN architecture.

Briefly, FIG. 1 shows the complete knowledge graph decomposed in a plurality of subgraph graphs based on functions. As is generally understood in the art, CNNs are generally divided into an input layer, one or more hidden layers, and an output layer. Various techniques can be used for implementing the SGCNN software. For example, in some embodiments, each layer is implemented as a separate software component configured to perform certain functions. In other embodiments, the functionality of multiple layers may be combined into a single software component.

Continuing with reference to FIG. 1, each function is used as input to an input layer of the SGCNN. In this example, the subgraphs are "GPS," "INS" and "HVAC"; however, as indicated by the ellipses, many subgraphs may be identified from the complete graph. Techniques for identifying subgraphs are generally known in the art and, thus not described herein in detail. The input layer generates a feature vector and location information for each functional indicating features of interest and the location of these functional graphs in the complete graph. Using the feature vectors and location information as input, a plurality of hidden layers process the data to provide a functional score for the subgraph. A non-linear activation function (e.g., ReLU) is applied between the hidden layers.

During the training process of the SGCNN, the labels of the functional graph examples are either annotated by domain experts, or are automatically extracted from the engineering software. For example, a Simulink model may contain a hierarchy of simulation blocks composed as a "propulsion" subsystem. These labels are readily available in the domain-specific models and tool-specific distillers can be employed to extract this information. Functional graphs are different; this means that the subgraph representing system A is different than the subgraph representing system B. Therefore, the SGCNN architecture trains different GCNNs based on the functional graph properties.

In FIG. 1, notice that the "GPS" and "INS" functional graph are different—three nodes and three edges vs five nodes and five edges—and each is used to train a separate GCNN. The other case is also true, when two functional graphs share the same structure as it is the case of the "INS" and "HVAC". SGCNN differentiates between various functional labels with the same graph structure in a GCNN by the generated feature vectors during the graph embedding step. Finally, functional graphs alone may not be sufficient to train the SGCNN because they lack context. Thus, as noted above, the complete graph (or part of it) is provided as an input for each hidden layer of the neural networks to guide the training process and help the model to converge faster. The context is provided by the location of these functional graphs in the complete graph. After training, the generated predictors ingest a subgraph and its context, and classify it to the functional labels.

Figure 2:
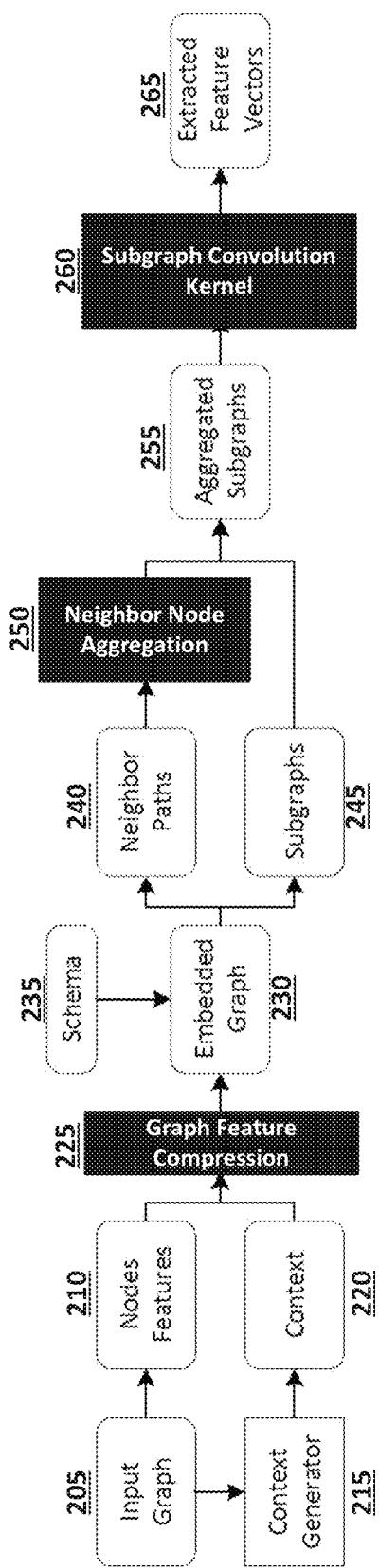
FIG. 2 provides a more detailed view of the processing involved with implementing the SGCNN, according to some embodiments.

FIG. 2 provides a more detailed view of the processing involved with implementing the SGCNN, according to some embodiments. Briefly, an input graph 205 is received or retrieved by a computer system. The computer system receives, retrieves, or otherwise determines labels for a plurality of node features 210 from the graph and applies a context generator 215 to generate context 220 from the graph. Various structures may be use for storing the data. For example, in one embodiment, the node features 210 are stored in a feature matrix that stores a feature description for each node in the input graph. The feature matrix would be sized N×D, where N is the number of nodes and D is the number of input features. Additionally, the graph structure can be provided in matrix form (e.g., as an adjacency matrix). A graph feature compression for graph-based learning layer 225 embeds all the node features 210 into vectors x in a plurality of embeddings, referred to herein as an embedded graph 230 defined according to a schema 235. The embedded graph 230 may be used to derive neighbor path information 240 and subgraphs 245. A neighbor nodes aggregation layer 250 implements a path-based method to aggregate neighbor nodes information into the target subgraph, thereby yielding aggregated subgraphs 255. Then, subgraph convolution kernel layer 260 performs a graph invariant convolution operation on the target subgraph to extract feature vectors 265. The details of the various components shown in FIG. 2 will be discussed in the following sections.

Graph Feature Compression for Graph-Based Learning

Heterogeneity of data presents a key challenge in the development of machine learning algorithms. Most off-the-shelf machine learning algorithms are trained on homogeneous feature data such as vectors in a certain vector space. The data in the SGCNN can be a mix of text, numerical, Boolean, and so on. The graph feature compression for graph-based learning disclosed herein provides a general purpose method for learning efficient representations of heterogeneous data, where efficiency is determined by the performance of downstream graph-based convolutional neural networks trained on the representation. In particular, the graph feature compression for graph-based learning technique facilitates the generation of a node-level embedding of graph data to be used as the feature data for training graph-based neural networks such as the SGCNN.

As used herein, the term embedding $f \rightarrow \mathbb{R}^d$ refers to a mapping sending each node $n \in N$ in the knowledge graph (e.g., DTG), to a vector $f(n) \in \mathbb{R}^d$ in a d-dimensional real vector space. In this context, d refers to the dimension of the embedding. The general structure of an embedding problem is conceptually simple. There are things one wishes to embed, to represent as a vector in some vector space. Rather than looking into a thing itself, for instance the letters of a particular word, we instead characterize a thing in terms of how it relates to other things, for instance what other words typically appear in the vicinity of a given word. The term "context" is used to refer to this set of other things which co-occur with the thing. The precise definition of context is a key step in generating an embedding since it is the various contexts in which a thing appears that ultimately determines its embedding.

It will be helpful to use the embedding of words occurring in a large text corpus to explain the general procedure. Given a large text corpus D, we call the set of words occurring in the corpus its vocabulary, V(D). Each unique word $w \in V(D)$ occurs with some integral frequency $N_w \in N$ from which one can calculate the so-called "unigram-distribution,"

$$p_w = \frac{N_w}{\sum_w N_w}. \qquad (1)$$

Next, we need to define a notion of context of a word. We refer to each occurrence of a word within the corpus as an instance of that word. One simple notion of context of a word is that of a window centered at each instance of that word. Thus with a window size of one, the context of a certain instance of a word comprises the words before and after that instance. This class of contexts, parameterized by the window size, takes proximity in the corpus as the relevant relationship between words for generating an embedding. One can choose other notions of context of a word: the next five words, every other word for five words, etc. This work presents a framework for generating embeddings from more general and typically less-local notions of context which capture richer relationships between entities beyond proximity.

Given some method for generating contexts, one still has to train an embedding. For example, Google's word2vec uses two dual methods of training an embedding: a model is trained to predict a context given a word, called the "Skip-Gram model," or to predict a word given a context, called the Continuous-Bag-of-Words model (CBOW). Skip-gram seeks to maximize the probability of context-words given a word p(c|w), while CBOW seeks to maximize the probability of a word given a context $p(w|c_w)$. Here, the context $c_w$ is simply a list of words $w_1, w_2, \ldots$ appearing in the context of word w. Word2vec is described in further detail in Mikolov, T., Chen, K., Corrado, G. S., & Dean, J. (2013). Efficient Estimation of Word Representations in Vector Space.

Given an initialized embedding $f:V(D) \rightarrow \mathbb{R}^d$, these probabilities are computed in the following way:

$$p(w \mid c) = \frac{e^{f(w) \cdot f(c_w)}}{\sum_w e^{f(w) \cdot f(c_w)}}, \quad (2)$$

where the embedding of a context is given by:

$$f(c_w) = \sum_{w_i \in c_w} f(w_i) \in R^d, \quad (3)$$

the dot -•-: $R^d \times R^d \rightarrow R$ is the standard inner product on $R^d$, and the denominator is a normalizing factor analogous to the partition function of statistical mechanics. We then seek an embedding which maximizes the log-likelihood of these conditional probabilities:

$$\max_f \sum_{w \in T} \ln(p(w \mid c_w)), \quad (4)$$

where T is some set of training words. Maintaining normalization of the probabilities across the entire vocabulary as the embeddings are updated is computationally expensive. The process of "contrastive-estimation" or negative sampling provides a convenient and efficient workaround of this bottleneck.

Figure 3A:
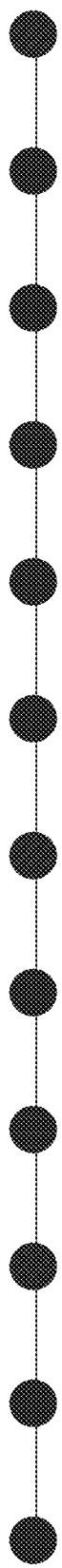
FIG. 3A shows an example graph where each node in the graph is the instance of a word in the corpus.
Figure 3B:
FIG. 3B shows an example graph using the structure shown in FIG. 3A with an example vocabulary of patterns.
Figure 3C:
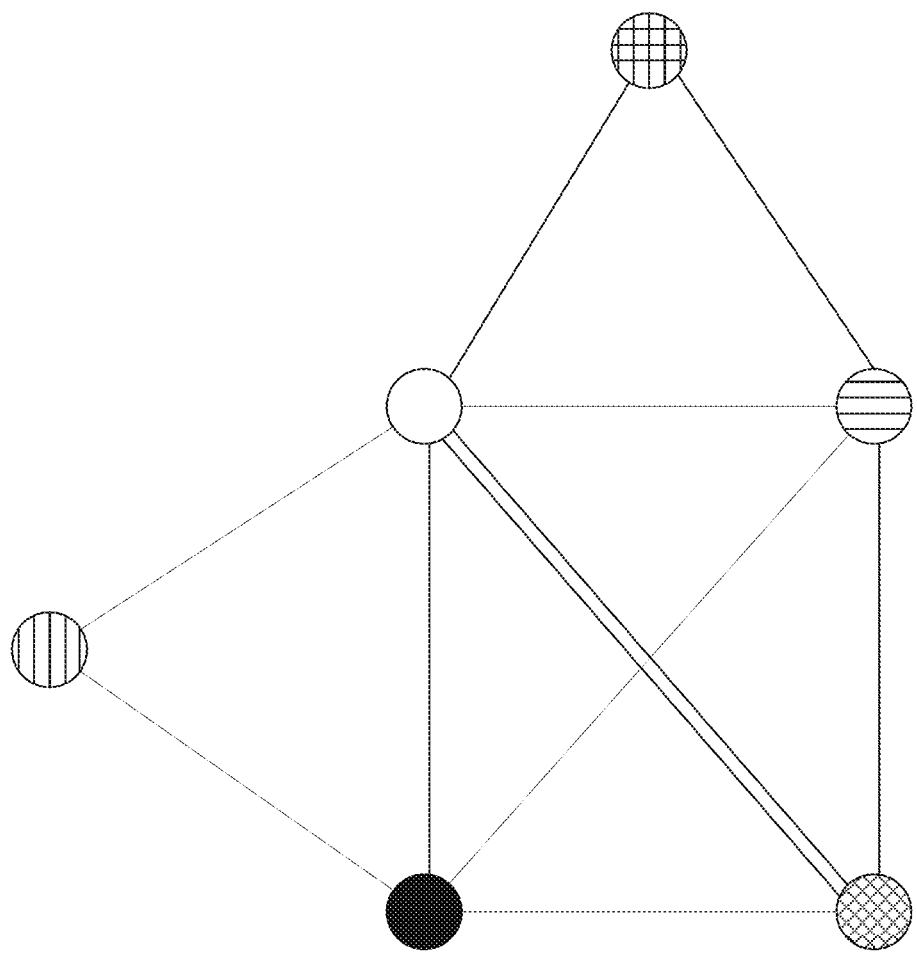
FIG. 3C shows an alternative view of the graph in FIG. 3B.

There exists a variety of approaches to generating embeddings for data which is living in a graph. The class of embeddings we extend are those which arise from pursuing analogies between the embedding of words in text and the embedding of nodes in a graph. Text in a document appears in an ordered fashion, one word after another with a natural notion of "forward" and "backward." At the document level, we can imagine a corpus as a graph as illustrated in FIG. 3A where each node in the graph is the instance of a word in the corpus. The context of a node consists of its neighbors, out to a specified distance or radius. Let us assume our vocabulary comprises 6 different patterns. Then, suppose the above document is of the form shown in FIG. 3B. Taking a window size equal to one, the context of 'blank' is the list (black, white, diagonal crosshatch, horizontal and vertical lines, horizontal lines only, vertical lines only). If we glue together all the vertices of the same pattern, we get the graph shown in FIG. 3C which is a different way to view the previous document. The neighbors of a node in the graph still provide a natural notion of context, analogous to the context windows described for word embedding. The neighborhood of a certain "radius" in a graph is the analogue of a window of a certain width in text.

Various other methods for context generation have been utilized in conventional embedding technologies. For instance, random walks of a certain length starting at a node provide a notion of context of a node. There is a balance between "local" and "non-local" context generation, commonly referred to as "depth-first" versus "breadth-first." Neighborhoods provide a breadth-first method of context sampling, while random walks provide more depth. The creators of the node2vec method for node embedding provide a nice method for finding the balance between depth and breadth in context generation. See Grover, A., & Leskovec, J. (2016). node2vec: Scalable Feature Learning for Networks. *KDD: proceedings. International Conference on Knowledge Discovery & Data Mining*, 2016, 855-864. They use a random walk, biased by two parameters p and q where roughly speaking, taking p large tells the walk 'don't go home,' while taking q large warns the walker of venturing too far out into the world of the graph. FIG. 4 provides an example of context sampling with the parameters r=2, n=3, and m=5.

Given a graph, there are fairly natural notions of node and subgraph-level contexts, but it is only the answer to the question, "What do you want to do with the embedding?," that provides a measure of "correctness" of a particular family of contexts. Embeddings can be used for a variety of downstream applications such as clustering. Many approaches seek to create generic node-level features, general in the sense that they are useful for a variety of downstream learning problems. If one thinks of embedding as a compression problem, then this approach seeks to compress the input data (a graph) while penalizing for particularly lossy compression as the notion of relevant information is very broadly defined. Alternatively, embeddings are often used directly to perform a clustering task via K-means or other methods. The loss function and method for generating such embeddings are specific to the task at hand and provide a compressed representation of the graph which preserves information relevant to performing this specific task.

In contrast to conventional techniques, the embedding technique described herein employs a method which balances the generality of more natural approaches with the performance of more structured methods for embedding. To this end, we assume that the purpose of an embedding is to serve as the feature data for the SGCNN which performs clustering. We take a semi-supervised approach to training the SGCNN, thus we expect an input of labelled training examples. We can leverage the existence of such a training set to generate embeddings which provide an efficient and powerful representation of the information contained in the graph from which the GCNN can learn more complicated structures, relationships, and relationships between structures present in the heterogeneous knowledge graph.

As noted above with respect to the context generator 215 in FIG. 2, context generation is an essential step in the embedding process performed by graph-based learning layer 225. There are various methods for generating contexts around nodes. For the techniques described herein, the preferable choice of context is the one which generates the embedding with the best performance on a downstream learning. One possible method for sampling contexts is as follows. First, a node in the knowledge graph is selected. Next, all the nodes within a certain radius r of that node are identified. The number of nodes in this neighborhood of a node grows quickly as the radius is increased. To generate m contexts of a fixed size n, n nodes are randomly selected from this set of neighbors m times. For larger radii, this sampling method is capable of producing both local and non-local contexts. This procedure is repeated for every node in the graph.

The resulting embedding, a vector representation of each node in our graph, summarizes the relationships encoded in the sampled contexts. One interesting feature of word and other embeddings is that they typically encode analogies. For instance the analogy "a is to b as c is to d" implies that the relationship between b and a is similar to the relationship between d and c. If we have vector representations $x_a, x_b, x_c, x_d \in R^d$, then the analogy holds when $$x_b - x_a = x_d - x_c + \varepsilon, \quad (5)$$

where ε is a tolerance factor selected, for example, based on desired precision of the data. Given vectors representing each node in the graph, one can pose analogies as a question.

Figure 5:
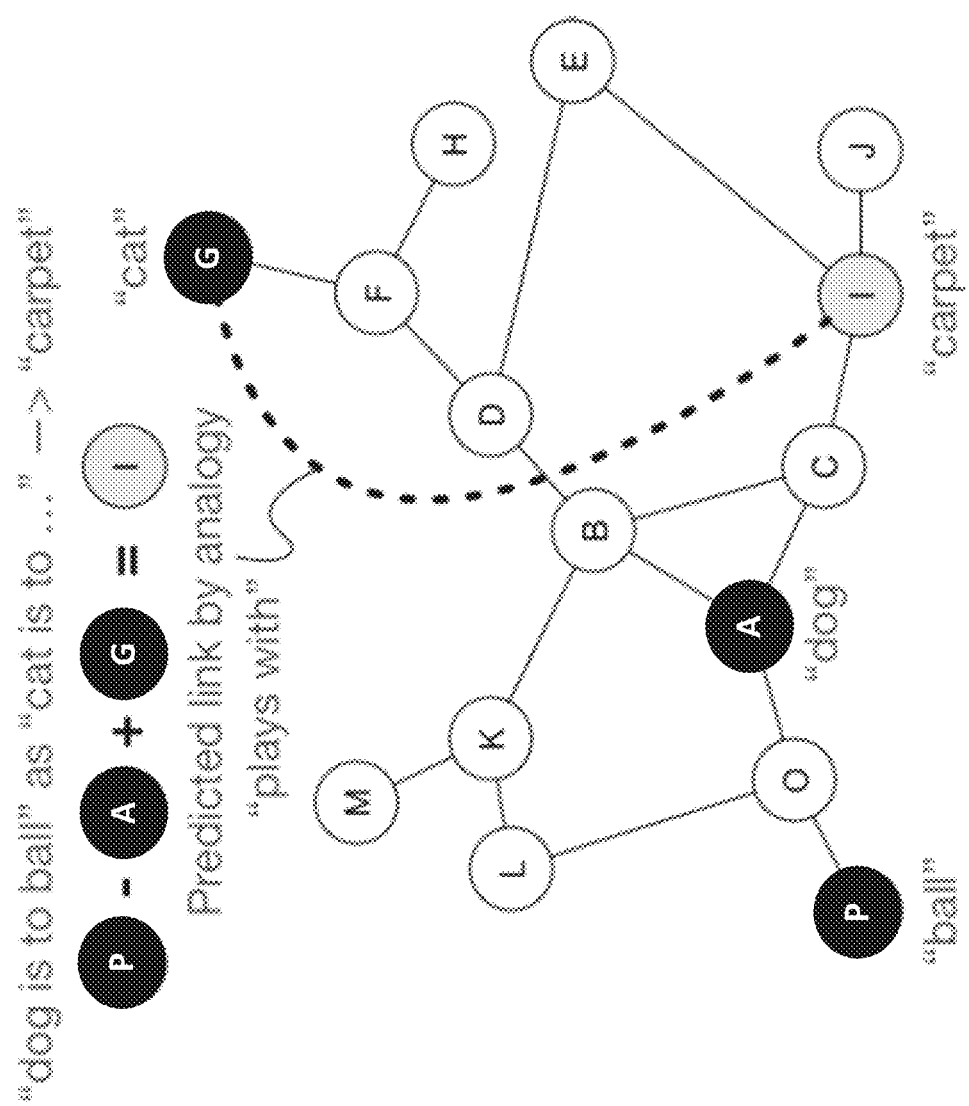
FIG. 5 provide an example of analogy completion on a graph, as may be performed in some embodiments.

Given $x_a$, $x_b$, $x_c$, find the vector or the node closest to $x_b-x_a+x_c$. On a graph, this provides a natural method for edge completion. FIG. 5 provides an example of analogy completion on a graph.

This embedding serves as the feature data for a GCNN capable of performing functional lifting. The GCNN is trained on a set of labelled structures occurring within the graph. Contexts of these labelled structures are generated in an analogous fashion. The GCNN then learns how to aggregate features within two layers, first how to aggregate features in the neighborhood of a structure and then how to aggregate within the structure in order to provide an efficient and flexible characterization of the various instances of these structural units and their neighborhoods. Thus we propose a general 3 step process for labelling structures from heterogeneous graph data: node-level embedding, aggregation of the context around a structure, and aggregation within the structure. Through training, the GCNN identifies effective feature aggregation strategies for the last two steps.

It has been shown recently, that the training procedure for neural networks proceeds in two distinct phases. See Naftali Tishby and Noga Zaslaysky. Deep learning and the information bottleneck principle. CoRR, abs/1503.02406, 2015. In the first phase, the network rapidly finds weights which do a good job of labelling outputs without throwing out much information contained in the inputs. This is the 'rough' and ready model. Depending on the particular parameters, training then enters a much longer phase of compression, where information in the inputs irrelevant to the outputs is discarded. Tishby argues that a big part of the effectiveness of deep neural networks is that this compression phase is sped up considerably by breaking the phase into distinct layers: compression in a single step is exponential in the number of bits discarded, so breaking a large network up into consecutive layers transforms the exponential of a sum to the sum of exponential providing a high-level theoretical explanation of the speedup provided by deep networks.

The hybrid embedding and SGCNN model described herein achieves better performance using shallower, easier to interpret networks by providing pre-compressed features via the embedding. This increases performance while providing additional strategies for building models capable of recognizing relationships and structures which may not be captured by existing methods for learning on graphs. This will provide improvement for a number of reasons. First, the structure of the model which the SGCNN will learn depends largely on the structure of the input data. By providing flexibility in the method by which the input feature data is generated from a heterogeneous graph, we enable the exploration of different classes of models which may perform well on different tasks. Second, the method of context generation described above utilizes the training data which comprises labelled structures and their neighborhoods. Thus, the techniques described herein provide an embedding which has already been tailored to the problem of structural classification.

Neighbor Nodes Aggregation

Figure 6:
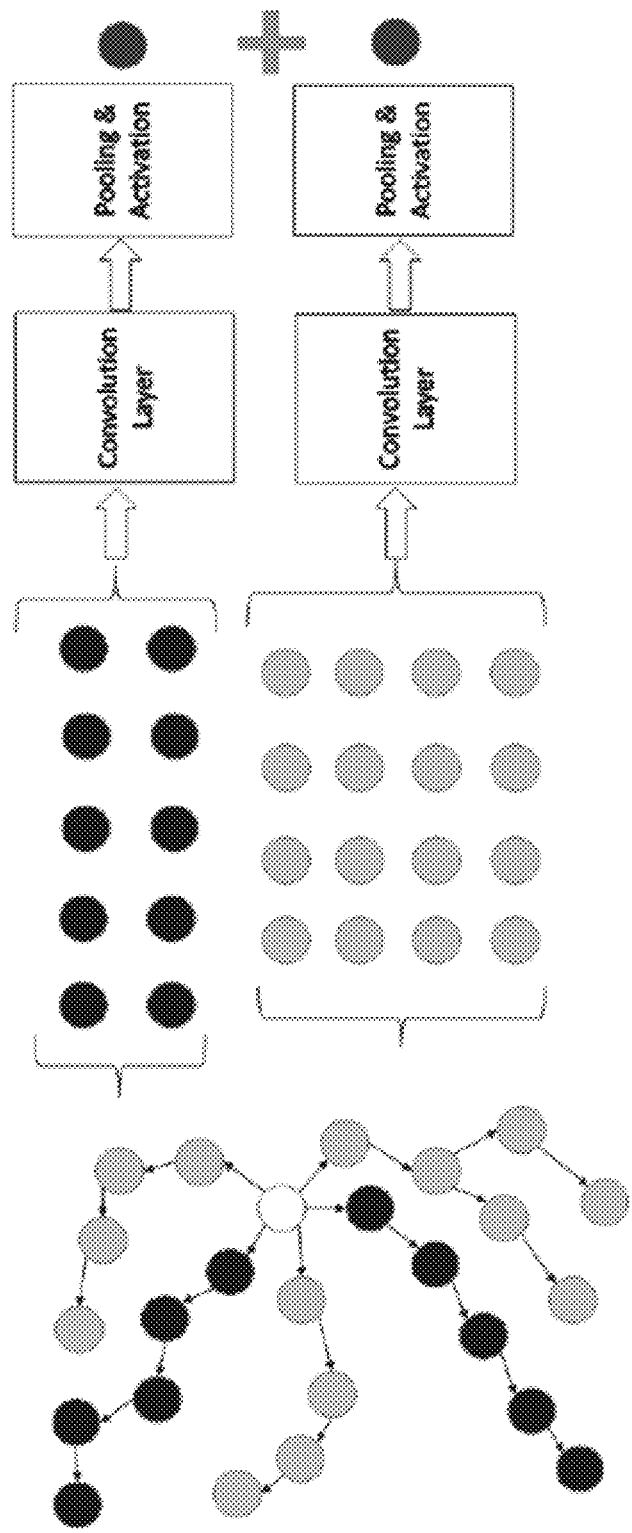
FIG. 6 shows an example of neighboring nodes aggregation that may be used by the neighbor nodes aggregation shown in FIG. 2.

FIG. 6 shows an example of neighboring nodes aggregation that may be used by the neighbor nodes aggregation layer 250 shown in FIG. 2. Similar to the vertex domain approach, given a graph $\mathcal{G}$, the neighbor node features of the target subgraph $\mathcal{G}_t=(\mathcal{V}_t, \mathcal{E}_t)$ are aggregated. As described in further detail below, a generalized path-based approach is employed that integrates two methods to collect neighbor nodes in a graph: (1) breadth first search and (2) depth first search.

Figure 7:
FIG. 7 shows an example of matrix operations performed by the SGCNN during neighbor nodes aggregation.

The neighbor nodes aggregation layer 250 is used as a hidden layer in SGCNN. For such as layer $1_{ag}$, we define two parameters: d as the depth to search, and n as the number of paths to be computed. For all $v_i \in \mathcal{V}_t$, we search $\mathcal{G}$ to find all length d paths $\mathcal{P}_i^d$, which includes $v_i$, but doesn't include any other nodes in $\mathcal{V}_t$. Then, we get all the neighbor paths of $\mathcal{G}_t$ as $\mathcal{P}^d = \{\mathcal{P}_0^d \mathcal{P}_1^d \ldots \}$. From $\mathcal{P}^d$, we randomly select n paths, and use each path as a row to form a neighbor feature matrix $\overline{N}$. Thus $\overline{N}$ is an n by d matrix with each element being a feature vector of a neighbor node. An example of the relevant matrix operations is shown in FIG. 7 Notice that in this case the number of paths found in $\mathcal{P}^d$ is smaller than n, we can simply pad the $\mathcal{P}^d$ to make it at least have n number of paths. Next task extracts feature vectors from N as the output of this layer. In some embodiments of the SGCNN a general 2-D convolution operation is applied with a trainable d by n weight matrix $\overline{W}$, and bias variable b to extract the neighbor nodes feature vectors $x_n$:

$$x_n = \overline{W} \odot \overline{N} + b \qquad (6)$$

Finally, we aggregate $x_n$ to $\mathcal{G}_t$ by concatenating all the feature vectors of $v_i \in \mathcal{V}_t$ as $x_{agg} = \{x_i, x_n\}$.

Subgraph Convolution Kernel

Figure 8:
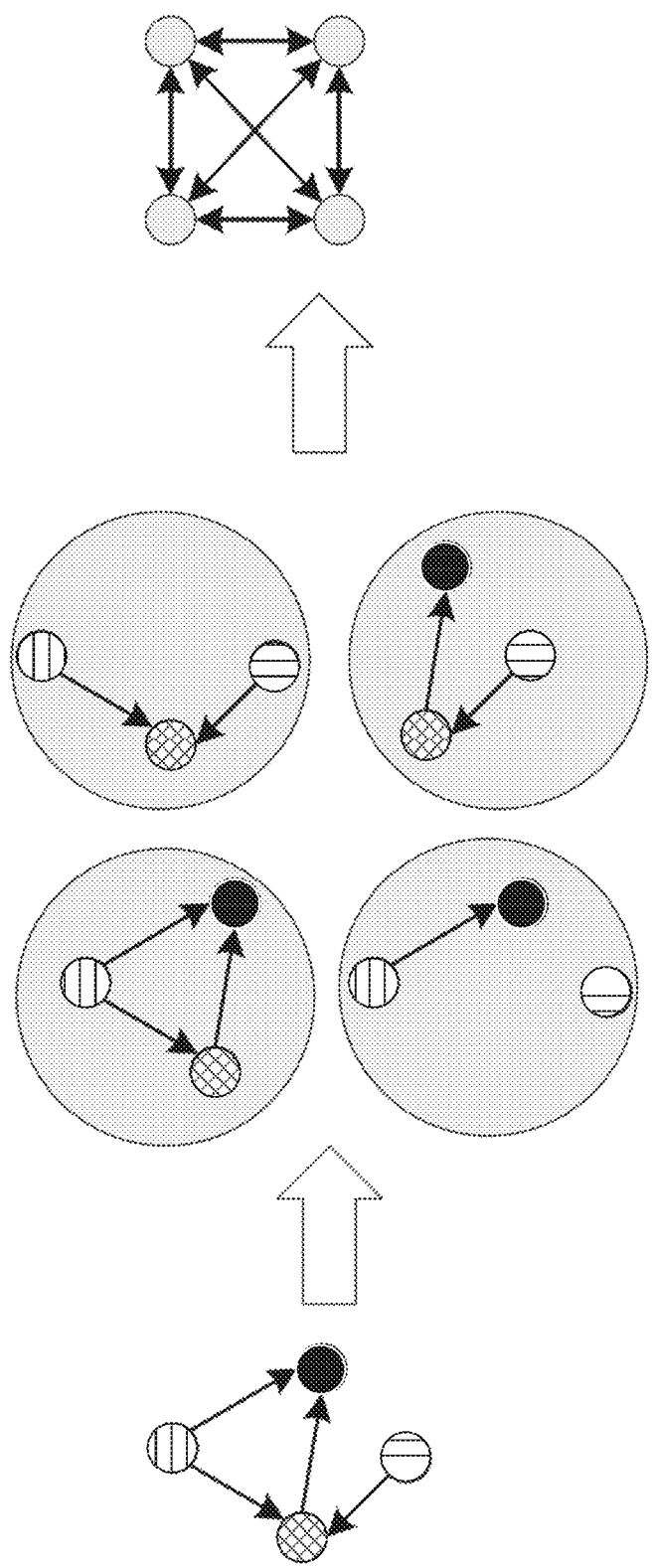
FIG. 8 shows an example visualization of the operations performed by the subgraph convolution kernel.

The task of the subgraph convolution kernel layer 260 shown in FIG. 2 is to extract feature vectors from graphs or subgraphs. An example visualization of the operations performed by the subgraph convolution kernel is presented in FIG. 8. Given a target graph $\mathcal{G}$ with n number of vertices, by listing all the feature vectors $x_i$ in a given order, we can get the feature vector X. Then, we repeat X by n times to form the feature matrix $\overline{X}$, with each row being $X$. With the adjacency matrix $\overline{A}$, we define the attribute matrix $\overline{Ar}$ of $\mathcal{G}$ as the Hadamard Product between $\overline{X}$ and $\overline{A}+\overline{I}$ as follows:

$$\overline{Ar} = \overline{X} \circ (\overline{N} + \overline{I})$$

where $\overline{I}$ is the identity matrix. For the purpose of maintaining the feature vectors for every vertex, we add a self-loop to each node by the addition of $\overline{I}$. Although this disclosure is targeted for unweighted graphs, the SGCNN can be easily expanded to a weighted graph by applying a weighted adjacency matrix $\overline{A}$. An example of attribute matrix is shown in FIG. 7.

Taking $\overline{Ar}$ as the inputs for the graph convolution operation, we define a graph convolution kernel to be a k by k weight matrix $\overline{W}^k$. Then, we apply the convolution between $\overline{W}^k$ and $\overline{A}$. However, in contrast to a grid-structured 2D convolution between matrices (which the kernel will slide following a top-down, left to right order), some embodiments employ a new definition of convolution operation in graph data structures.

Because each row or column in $\overline{Ar}$ is actually corresponding to a vertex in $\mathcal{G}_t$, removing the i row and i column equals to removing the vertex i from $\mathcal{G}_t$. Assuming that n is bigger than k, in some embodiments, n-k vertices are removed from $\mathcal{G}_t$, and the remaining subgraph has a new k by k attribute matrix $\overline{Ar}^k$. There are $$\binom{n}{k}$$

number of possible $\overline{A}r^k$. Thus, for all the possible $\overline{A}r^k$, we apply a simple convolution operation to extract feature vectors from this leftover subgraph as follows:

$$x^k = \overline{W}^k \odot \overline{A}_r{}^k + b \qquad (7)$$

This example results in m extracted feature vectors as: $x_1^k, x_2^k, \ldots, x_m^k$, and $$m = \binom{N}{k}$$

if we consider all possibilities. However, the complexity of this operation will be $$o\left(\binom{n}{k}\right),$$

which is unacceptable in practice. To relax it, in some embodiments, we only select m=n number of $\overline{A}r^k$ as convolution candidates which reduces the complexity to O(n). Notice that m is a parameter that can be further optimized in the future. In some embodiments, we consider the extracted feature vectors $x_1^k, x_2^k, \ldots, x_m^k$ as a new fully-connected graph $\mathcal{G}_m$ with m number of vertices, and for $x_i^k$ is the feature vector for node i. $\mathcal{G}_m$ which can be used to input into another subgraph convolution kernel layer 260 in the SGCNN architecture.

Figure 9:
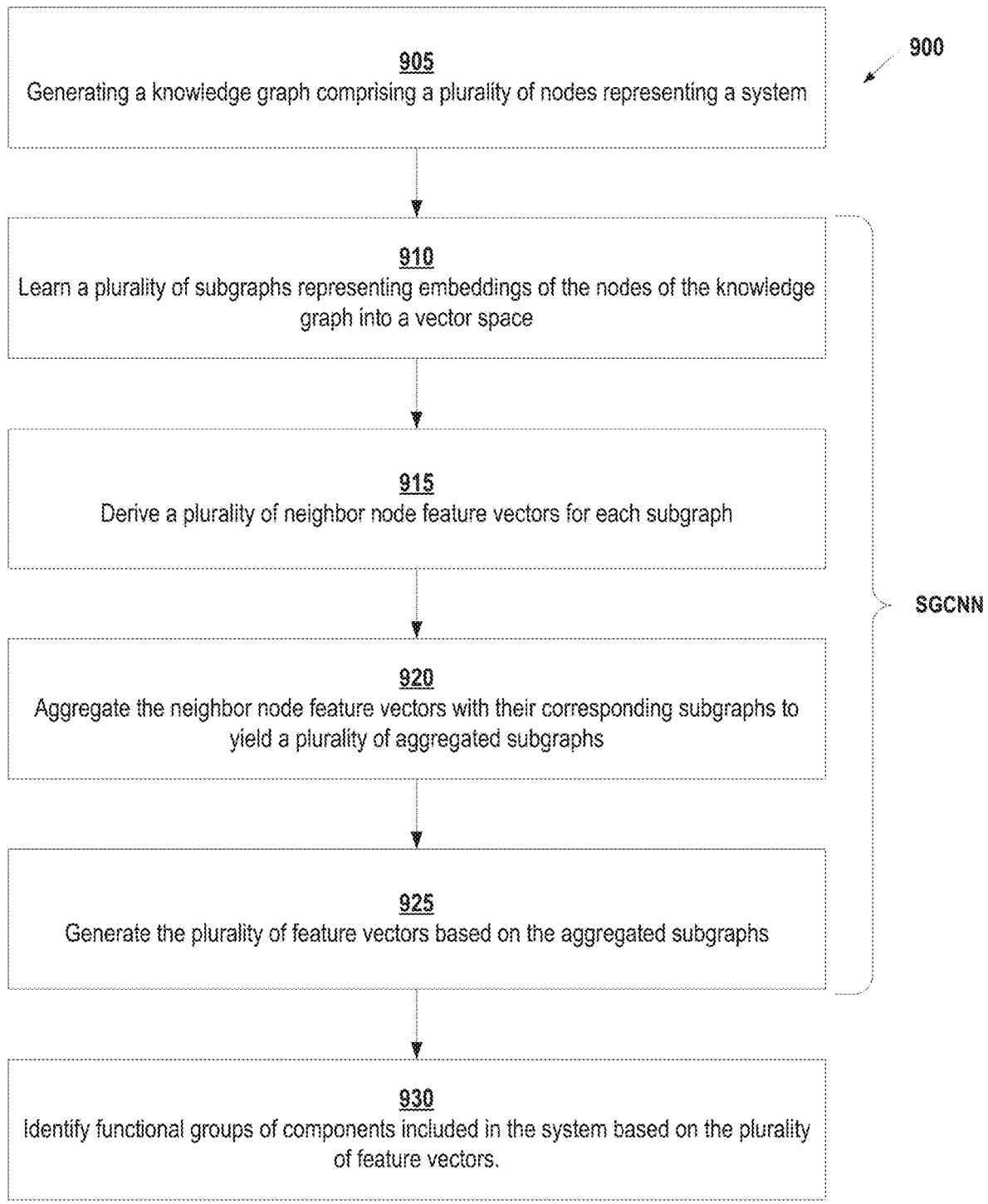
FIG. 9 illustrates a computer-implemented method for learning structural relationships between nodes of a graph, according to some embodiments.

FIG. 9 illustrates a computer-implemented method 900 for learning structural relationships between nodes of a graph, according to some embodiments. Starting at step 905, a knowledge graph is generated that comprises a plurality of nodes representing a system. In one embodiment, the knowledge graph is a DTG with a plurality of subgraphs and each subgraph represents a digital twin of a subsystem of the system.

Next, at steps 910-925, a SGCNN is applied to the knowledge graph to generate feature vectors describing structural relationships between the nodes. At step 910, the SGCNN learns subgraphs representing embeddings of the nodes of the knowledge graph into a vector space. In some embodiments, the embedding of each node is learned with respect to a plurality of contexts and each context corresponds to a neighborhood of nodes connected to the node in the knowledge graph. These contexts may be generated for each node by first identifying a set of nodes with a predetermined radius from the node in the knowledge graph, and then generating the contexts around each node by randomly sampling the set of nodes a predetermined number of times. The number of samplings may be determined, for example, based on the computational resources available for executing the SGCNN.

Neighbor node feature vectors are derived at step 915 for each subgraph. As described above, the neighbor node feature vectors may be derived for each subgraph by generating a neighbor feature matrix comprising neighbor paths in the subgraph, and then applying a 2D convolution operation with a trainable matrix and a bias variable to extract the neighbor node feature vectors from the neighbor feature matrix. The neighbor feature matrix may be generated for each subgraph by first determining all neighboring paths for the subgraph. This may be accomplished by identifying, for each vertex in the subgraph, paths in the knowledge graph that include the vertex but no other vertices in the subgraph. Next, a subset of all neighboring paths can be randomly selected and each path can be used in the subset as a row in the neighbor feature matrix. The neighbor node feature vectors are aggregated with their corresponding subgraphs at step 920 to yield a plurality of aggregated subgraphs.

Continuing with reference to FIG. 9, at step 925 the feature vectors are generated based on the aggregated subgraphs. For example, as described in further detail above, in some embodiments the SGCNN generates an adjacency matrix defining connections between the nodes of the knowledge graph and a feature matrix based on the aggregated subgraphs. An attribute matrix can then be generated as a composition of the adjacency matrix and the feature matrix, and the feature vectors can be determined by applying a convolution between the attribute matrix and a graph convolution kernel.

Finally, at step 930, functional groups of components included in the system are identified based on the plurality of feature vectors. This identification is based on the labelling performed during training. For example, in some embodiments, labelled components are used in training the SGCNN and the feature vectors each provide a functional score indicating similarity to one of the labelled components. The functional groups of components included in the system may then be identified by first determining a subset of the feature vectors having a functional score above a threshold value, and then designating the labelled components corresponding to the subset of the feature vectors as the functional groups of components included in the system.

One example application of the SGCNN network described herein is performing functional lifting in digital twin graphs. In this context, the term "functional lifting" refers to the process of inferring the functionality of a system from its detailed engineering specifications such as its configuration, hybrid equations, geometry, sensor data, etc. More specifically, a functional model uses high-level modeling abstractions to represent the functionalities of systems or subsystems. Based on this information, systems that are functionally equivalent (i.e., they provide the same or most of the same functionalities) may be identified. From a technical standpoint, the problem is equivalent to a structure clustering problem from a knowledge graph. Given a set of subgraphs, labeled with functional information by domain experts, this can be represented as a training a machine learning predictor that learns the structural properties of the subgraphs and is able to classify these into the known labels. Given a DTG, the resulting SGCNN predictor is able to generate different functional scores. In FIG. 1, for example, a "GPS" graph and an "INS" graph will have a high score in the "Navigation" functionality indicating that both provide "Navigation Aid" functionality. This capability opens new possibilities for finding functionally equivalent components in a large complex system such as an airplane. It also enables knowledge transfer between airplanes with a digital thread/trail (e.g., F-35) to legacy platforms (e.g., F-18) under the observation that despite the different components/subsystems, both platforms provide similar functionality.

Figure 10:
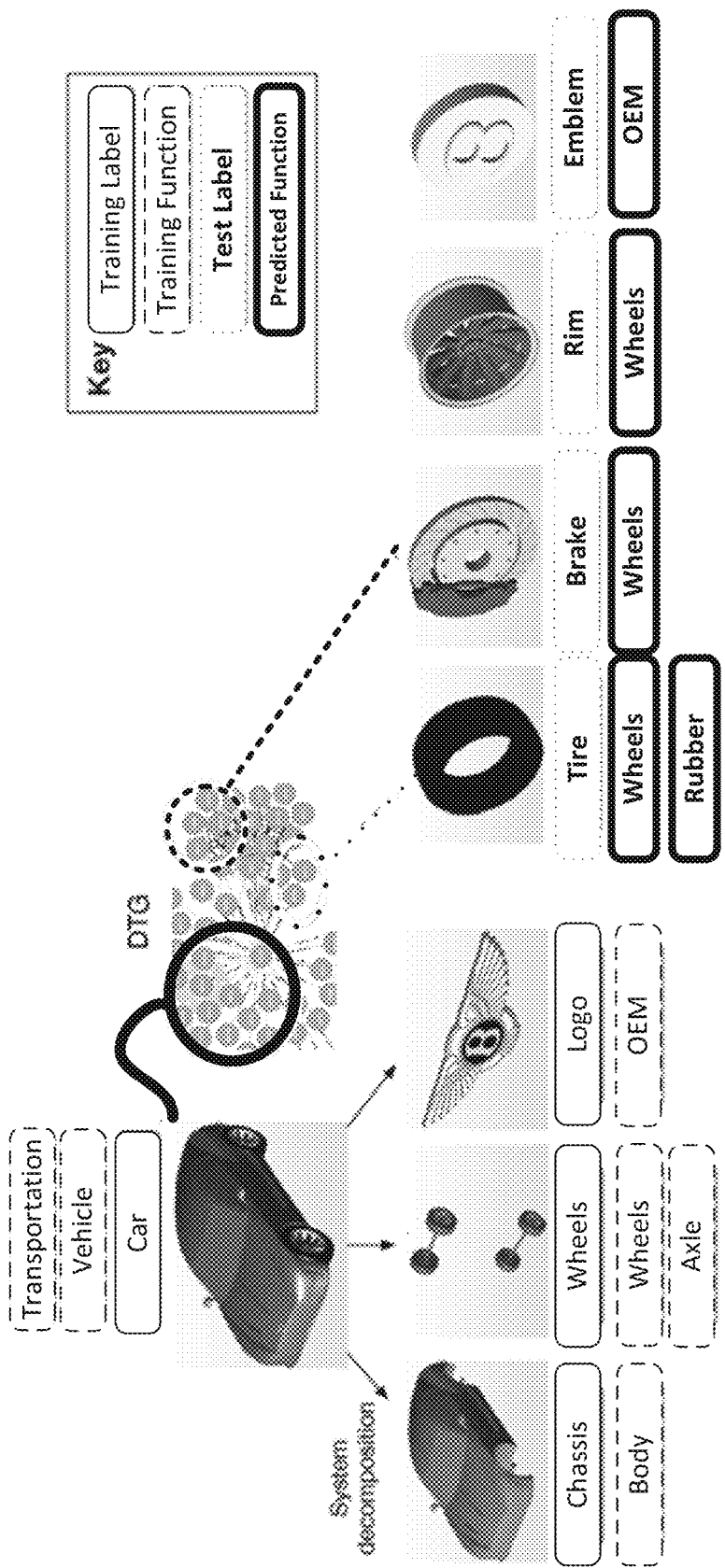
FIG. 10 shows how functional lifting works on 3D geometric data, according to some embodiments.

FIG. 10 shows how functional lifting works on 3D geometric data, according to some embodiment. One example application of the SGCNN architecture is functional lifting in digital twin graphs (DTG). Briefly, functionality can be "lifted" from legacy models and systems from platforms that do not have a digital thread. The workflow for functional lifting is to ingest functionality data into the DTG, train the SGCNN based on existing labels using different window sizes, and use the trained SGCNN to lift functional models. The lifted functional models shall help the engineers identify the cascading effects of changes in the design (e.g., new sensor technology).

For the purposes of the example shown in FIG. 10, assume that the DTG labels are generated using a community-based resource such as GrabCAD. As is generally known in the art, GrabCAD is the largest online community of designers, engineers and manufacturers where they share 3D CAD models. The GrabCAD data is sparse and the labels are not consistent (e.g., American vs British English). In GrabCAD, the training labels are embedded in the Grab-CAD models as titles of the models. The training functions are manually annotated by domain experts. Some models include information on their system decomposition as it is the case with the "car" model decomposed into "chassis", "wheels", and "logo". Using the labeled data, a SGCNN predictor can be trained to generate functions for the test graphs. In the example of FIG. 9, the "tire" test graph scores high in two functional groups: "wheels" and "rubber", the "brake" scores high in the "wheels" functional group, etc. This example helps to illustrate how an engineer wanting to change the material of the "wheel" in the "car" model can be assisted by functional lifting to identify how other models such as "tire", "brake", and "rim" may be affected. This can be mapped to the systems re-engineering problem of identifying functional groups of components and subsystems during a systems re-engineering process.

Figure 11:
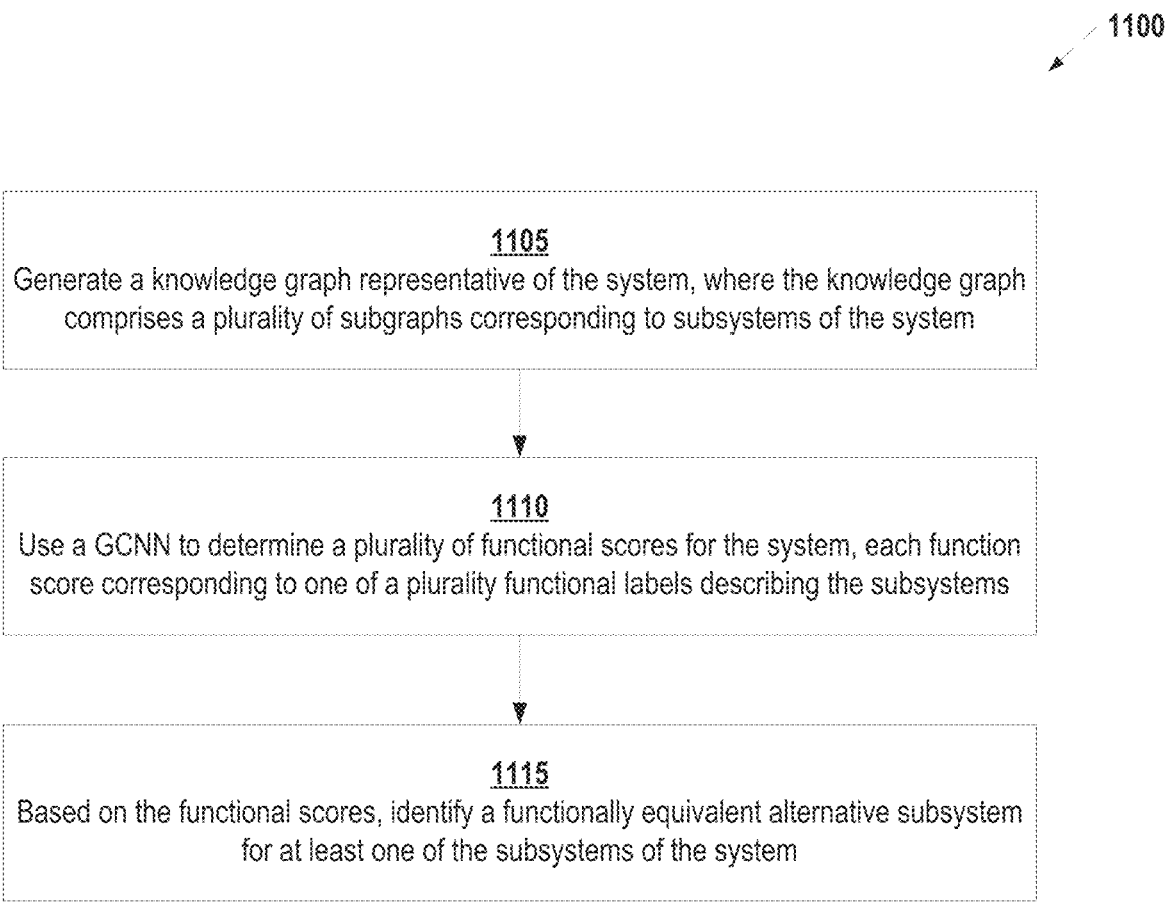
FIG. 11 shows an example computer-implemented method for inferring functionality of a system using a SGCNN.
Figure 12:
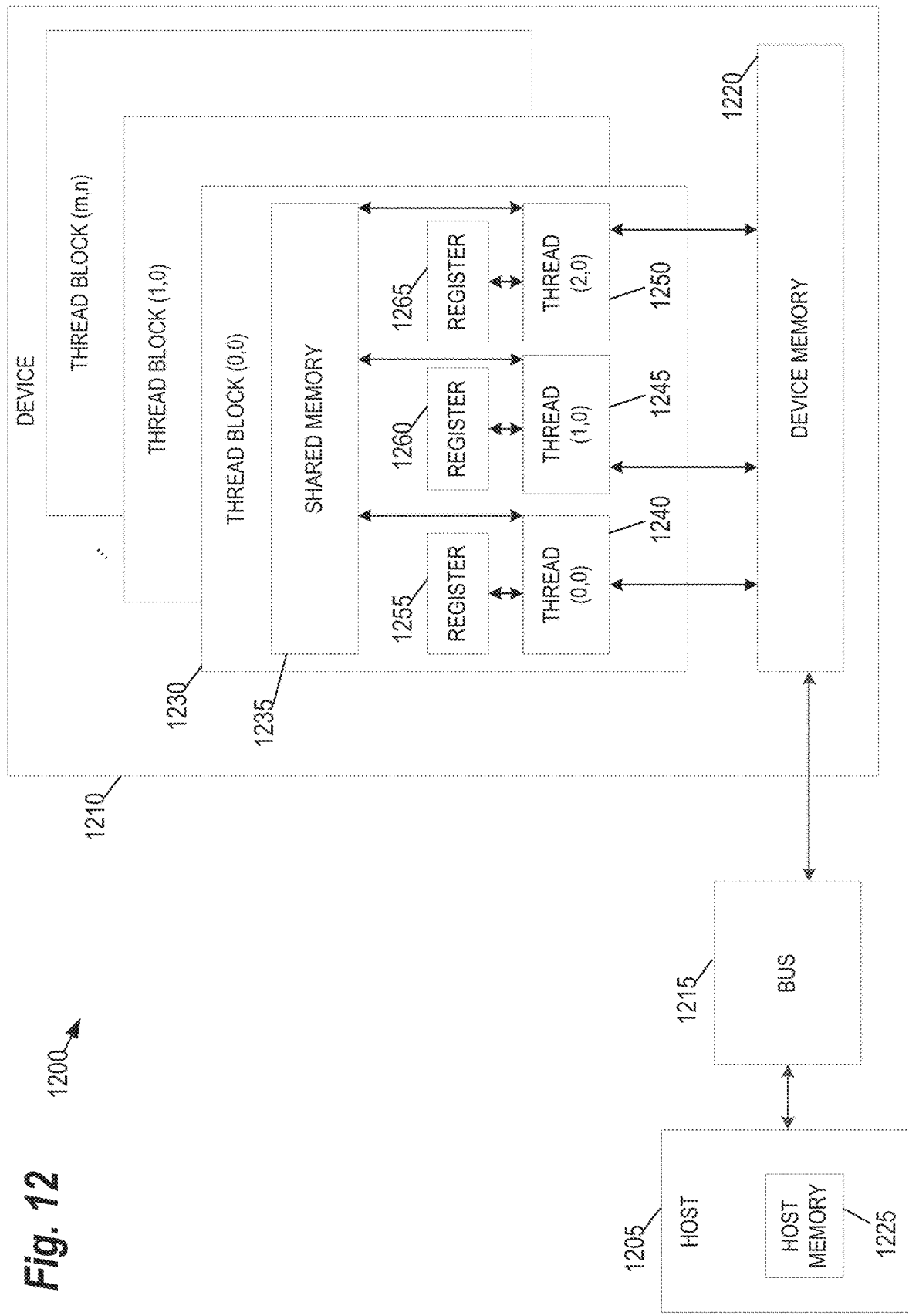
FIG. 12 provides an example of a parallel processing memory architecture 1200 that may be utilized by to perform computations related to execution of SGCNN discussed herein, according to some embodiments of the present invention.

FIG. 11 shows an example computer-implemented method for inferring functionality of a system using a SGCNN. Starting at step 1105 a knowledge graph representative of the system is generated. This graph may be generated, for example, by parsing engineering specifications related to the system such as its configuration, hybrid equations, geometry, sensor data, etc. The knowledge graph comprises a plurality of subgraphs corresponding to subsystems of the system. At step, 1110, the SGCNN is used to determine functional scores for the system. Each functional score corresponds to one of a plurality functional labels describing the subsystems. Then, at step 1115, based on the functional scores, a functionally equivalent alternative subsystem for at least one of the subsystems of the system is identified. For example, in one embodiment, a database may store functional scores associated with a variety of different systems. By comparing the functional scores generated at step 1110 with the scores in the database, functional equivalents can be identified. In some embodiments, an additional machine learning model may be employed that takes functional scores as input and outputs a score for each system in the database indicating its similarity to the system of interest. In one embodiment, the functionally equivalent alternative subsystem(s) may be presented to a user along with a measurement of how similar the functionally equivalent alternative subsystem(s) are to the system of interest. This measurement may be derived, for example, based on the difference between the functional score of the functionally equivalent alternative subsystem(s) and the scores of the system of interest FIG. 12 provides an example of a parallel processing memory architecture 1200 that may be utilized to perform computations related to the execution of SGCNN as discussed herein, according to some embodiments of the present invention. This architecture 1200 may be used in embodiments of the present invention where NVIDIA™ CUDA (or a similar parallel computing platform) is used. The architecture includes a host computing unit ("host") 1205 and a GPU device ("device") 1210 connected via a bus 1215 (e.g., a PCIe bus). The host 1205 includes the central processing unit, or "CPU" (not shown in FIG. 12) and host memory 1225 accessible to the CPU. The device 1210 includes the graphics processing unit (GPU) and its associated memory 1220, referred to herein as device memory. The device memory 1220 may include various types of memory, each optimized for different memory usages. For example, in some embodiments, the device memory includes global memory, constant memory, and texture memory.

Parallel portions of a deep learning application may be executed on the architecture 1200 as "device kernels" or simply "kernels." A kernel comprises parameterized code configured to perform a particular function. The parallel computing platform is configured to execute these kernels in an optimal manner across the architecture 1200 based on parameters, settings, and other selections provided by the user. Additionally, in some embodiments, the parallel computing platform may include additional functionality to allow for automatic processing of kernels in an optimal manner with minimal input provided by the user.

The processing required for each kernel is performed by grid of thread blocks (described in greater detail below). Using concurrent kernel execution, streams, and synchronization with lightweight events, the architecture 1200 of FIG. 12 (or similar architectures) may be used to parallelize training of the SGCNN. For example, in some embodiments, processing of individual subgraphs of the knowledge graph may be performed in parallel.

The device 1210 includes one or more thread blocks 1230 which represent the computation unit of the device 1210. The term thread block refers to a group of threads that can cooperate via shared memory and synchronize their execution to coordinate memory accesses. For example, in FIG. 12, threads 1240, 1245 and 1250 operate in thread block 1230 and access shared memory 1235. Depending on the parallel computing platform used, thread blocks may be organized in a grid structure. A computation or series of computations may then be mapped onto this grid. For example, in embodiments utilizing CUDA, computations may be mapped on one-, two-, or three-dimensional grids. Each grid contains multiple thread blocks, and each thread block contains multiple threads. For example, in FIG. 12, the thread blocks 1230 are organized in a two dimensional grid structure with m+1 rows and n+1 columns. Generally, threads in different thread blocks of the same grid cannot communicate or synchronize with each other. However, thread blocks in the same grid can run on the same multiprocessor within the GPU at the same time. The number of threads in each thread block may be limited by hardware or software constraints. In some embodiments, processing of subsets of the training data or operations performed by the algorithms discussed herein may be partitioned over thread blocks automatically by the parallel computing platform software. However, in other embodiments, the individual thread blocks can be selected and configured to optimize training of the SGCNN. For example, in one embodiment, each thread block is assigned a subgraph of the knowledge graph.

Continuing with reference to FIG. 12, registers 1255, 1260, and 1265 represent the fast memory available to thread block 1230. Each register is only accessible by a single thread. Thus, for example, register 1255 may only be accessed by thread 1240. Conversely, shared memory is allocated per thread block, so all threads in the block have access to the same shared memory. Thus, shared memory 1235 is designed to be accessed, in parallel, by each thread 1240, 1245, and 1250 in thread block 1230. Threads can access data in shared memory 1235 loaded from device memory 1220 by other threads within the same thread block (e.g., thread block 1230). The device memory 1220 is accessed by all blocks of the grid and may be implemented by using, for example, Dynamic Random-Access Memory (DRAM).

Each thread can have one or more levels of memory access. For example, in the architecture 1200 of FIG. 12, each thread may have three levels of memory access. First, each thread 1240, 1245, 1250, can read and write to its corresponding registers 1255, 1260, and 1265. Registers provide the fastest memory access to threads because there are no synchronization issues and the register is generally located close to a multiprocessor executing the thread. Second, each thread 1240, 1245, 1250 in thread block 1230, may read and write data to the shared memory 1235 corresponding to that block 1230. Generally, the time required for a thread to access shared memory exceeds that of register access due to the need to synchronize access among all the threads in the thread block. However, like the registers in the thread block, the shared memory is typically located close to the multiprocessor executing the threads. The third level of memory access allows all threads on the device 1210 to read and/or write to the device memory. Device memory requires the longest time to access because access must be synchronized across the thread blocks operating on the device. Thus, in some embodiments, the processing of each subgraph is coded such that it primarily utilizes registers and shared memory and only utilizes device memory as necessary to move data in and out of a thread block.

The embodiments of the present disclosure may be implemented with any combination of hardware and software. For example, aside from parallel processing architecture presented in FIG. 12, standard computing platforms (e.g., servers, desktop computer, etc.) may be specially configured to perform the techniques discussed herein. In addition, the embodiments of the present disclosure may be included in an article of manufacture (e.g., one or more computer program products) having, for example, computer-readable, non-transitory media. The media may have embodied therein computer readable program codes for providing and facilitating the mechanisms of the embodiments of the present disclosure. The article of manufacture can be included as part of a computer system or sold separately.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

As used herein, the term "component" can refer to either or both of: (i) a software component that causes an electronic device to accept various inputs and generate certain outputs; or (ii) an electronic input/output interface, such as a panel, frame, textbox, window or other portion of a GUI.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112(f) unless the element is expressly recited using the phrase "means for."

We claim:

1. A computer-implemented method for learning structural relationships between nodes of a graph, the method comprising:
  generating a knowledge graph comprising a plurality of nodes representing a system;
  applying a graph-based convolutional neural network (GCNN) to the knowledge graph to generate a plurality of feature vectors describing structural relationships between the nodes, wherein the GCNN comprises:
  a graph feature compression layer configured to learn a plurality of subgraphs representing embeddings of the nodes of the knowledge graph into a vector space, the plurality of subgraphs being selected from a heterogeneous knowledge graph as a selected number of neighboring nodes from each node in the knowledge graph to define a path associated with the node, and a second selected number of paths associated with the node,
  a neighbor nodes aggregation layer configured to (i) derive a plurality of neighbor node feature vectors for each subgraph and (ii) aggregate the neighbor node feature vectors with their corresponding subgraphs to yield a plurality of aggregated subgraphs,
  a context generator for generating context of each node in the knowledge graph by:
    for each target node, selecting all nodes within a certain radius of the target node;
    randomly selecting a number n nodes from the selected nodes to generate a context of the target node; and selecting a number m contexts for each target node, each context having a size n;

a subgraph convolution layer configured to generate the plurality of feature vectors based on the aggregated subgraphs and contexts; and identifying functional groups of components included in the system based on the plurality of feature vectors.

2. The method of claim 1, wherein the embedding of each node is learned with respect to a plurality of contexts and each context corresponds to a neighborhood of nodes connected to the node in the knowledge graph.

3. The method of claim 2, wherein the plurality of contexts are generated for each node by:
identifying a set of nodes with a predetermined radius from the node in the knowledge graph;
generating the plurality of contexts around each node by randomly sampling the set of nodes a predetermined number of times.

4. The method of claim 1, wherein the plurality of neighbor node feature vectors are derived for each subgraph by:
generating a neighbor feature matrix comprising a plurality of neighbor paths in the subgraph; and
applying a 2D convolution operation with a trainable matrix and a bias variable to extract the neighbor node feature vectors from the neighbor feature matrix.

5. The method of claim 4, wherein the neighbor feature matrix is generated for each subgraph by:
determining all neighboring paths for the subgraph by identifying, for each vertex in the subgraph, a plurality of paths in the knowledge graph that include the vertex but no other vertices in the subgraph;
randomly selecting a subset of all neighboring paths; and
using each path in the subset as a row in the neighbor feature matrix.

6. The method of claim 1, wherein the subgraph convolution layer determines the plurality of feature vectors based on the aggregated subgraphs using a process comprising:
generating an adjacency matrix defining connections between the plurality of nodes;
generating a feature matrix based on the aggregated subgraphs;
generating an attribute matrix as a composition of the adjacency matrix and the feature matrix;
determining the plurality of feature vectors by applying a convolution between the attribute matrix and a graph convolution kernel.

7. The method of claim 1, wherein a plurality of labelled components are used in training the GCNN and the plurality of feature vectors each provide a functional score indicating similarity to one of the labelled components.

8. The method of claim 7, wherein the functional groups of components included in the system are identified:
identifying a subset of the feature vectors having a functional score above a threshold value; and
designating the labelled components corresponding to the subset of the feature vectors as the functional groups of components included in the system.

9. The method of claim 1, wherein the knowledge graph comprises a plurality of subgraphs and each subgraph represents a digital twin of a subsystem of the system.

10. A computer-implemented method for learning structural relationships between nodes of a graph, the method comprising:
receiving a knowledge graph comprising a plurality of subgraphs labeled with functional labels describing one or more systems, wherein each subgraph corresponds to a subsystem of at least one of the systems the plurality of subgraphs being selected from a heterogeneous knowledge graph as a selected number of neighboring nodes from each node in the knowledge graph to define a path associated with the node, and a second selected number of paths associated with the node;
generating context of each node in the knowledge graph by:
for each target node, selecting all nodes within a certain radius of the target node;
randomly selecting a number n nodes from the selected nodes to generate a context of the target node; and
selecting a number m contexts for each target node, each context having a size n;
training a graph convolutional neural network (GCNN) to classify structural relationships between nodes of the subgraphs into the functional labels based in part on the context of nodes in the knowledge graph;
receiving a new knowledge graph corresponding to a new system; and
using the GCNN to determine a plurality of functional scores for the new system, each function score corresponding to one of the functional labels.

11. The method of claim 10, wherein the knowledge graph is a digital twin graph and each subgraph represents a digital twin of the corresponding subsystem.

12. The method of claim 10, wherein the functional labels are generated by:
extracting the functional labels from one or more domain-specific models corresponding to the system.

13. The method of claim 12, wherein the GCNN comprises a graph feature compression layer configured to apply an embedding to the knowledge graph using structural relationships between nodes in the knowledge graph as context to yield an embedded graph in a vector space.

14. The method of claim 12, wherein the structural relationships are generated for each node by:
identifying a set of nodes with a predetermined radius from the node in the knowledge graph;
generating the structural relationships for each node by randomly sampling the set of nodes a predetermined number of times.

15. The method of claim 12, wherein the GCNN comprises a neighbor nodes aggregation layer configured to (i) derive a plurality of neighbor node feature vectors for subgraphs of the embedded graph and (ii) aggregate the neighbor node feature vectors with their corresponding subgraphs of the embedded graph to yield a plurality of aggregated subgraphs.

16. The method of claim 14, wherein the GCNN further comprises a subgraph convolution layer configured to determine the plurality of functional scores based on the aggregated subgraphs.

* * * * *